(12) United States Patent
Akkarakaran et al.

(10) Patent No.: US 10,548,136 B2
(45) Date of Patent: Jan. 28, 2020

(54) PAGING RESPONSE IN BEAMFORMED SYSTEMS

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US); Makesh Pravin John Wilson, San Diego, CA (US); Wooseok Nam, San Diego, CA (US); Shengbo Chen, San Diego, CA (US); Kaushik Chakraborty, San Diego, CA (US); Xiao feng Wang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 15/889,072

(22) Filed: Feb. 5, 2018

(65) Prior Publication Data

US 2018/0227900 A1 Aug. 9, 2018

Related U.S. Application Data

(60) Provisional application No. 62/456,404, filed on Feb. 8, 2017.

(51) Int. Cl.
*H04W 72/04* (2009.01)
*H04W 68/02* (2009.01)
(Continued)

(52) U.S. Cl.
CPC ........ *H04W 72/046* (2013.01); *H04B 17/318* (2015.01); *H04W 56/00* (2013.01); *H04W 68/02* (2013.01)

(58) Field of Classification Search
CPC . H04W 72/046; H04W 68/025; H04W 68/02; H04W 56/00; H04B 7/0632; H04B 7/0695; H04B 17/318
See application file for complete search history.

(56) References Cited

U.S. PATENT DOCUMENTS

2017/0273052 A1* 9/2017 Liu ................. H04W 60/005
2017/0366236 A1* 12/2017 Ryoo .................. H04B 7/0421
(Continued)

FOREIGN PATENT DOCUMENTS

WO WO-2016172652 A1 10/2016

OTHER PUBLICATIONS

Intel Corporation: "Further Considerations on Paging", 3GPP Draft; R2-1701727, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 4, 2017 (Feb. 4, 2017), 3 Pages, XP051223635, Retrieved from the Internet: URL: http://www.3gpp.org/ftp/tsg_ran/WG2_RL2/TSGR2_97/Docs/ [retrieved on Feb. 4, 2017].

(Continued)

*Primary Examiner* — Afshawn M Towfighi
(74) *Attorney, Agent, or Firm* — Arent Fox, LLP

(57) ABSTRACT

Aspects of the present disclosure implement techniques to allow a base station to transmit a "short-page" message (e.g., paging indicators) to one or more UEs. The short-page message may be decoded by all UEs in the paging cycle and identifies a subset of UEs from the full set of UEs that are paged by the base station. Upon decoding the short page transmitted by the base station, the UE may respond with a "short-page response" to the base station on a transmit beam that offers best signal quality (e.g., low signal-to-noise ratio, transmit power, etc.). Thus, in some examples, the UE, in (Continued)

response to receiving a short paging message, may provide feedback to the base station such that the base station may select a transmit beam for transmission for a subsequent message (and other communications).

27 Claims, 7 Drawing Sheets

(51) Int. Cl.
*H04B 17/318* (2015.01)
*H04W 56/00* (2009.01)

(56) References Cited

U.S. PATENT DOCUMENTS

2018/0027522 A1 1/2018 Lee et al.
2018/0338321 A1* 11/2018 Shepard ............... H04B 7/0452

OTHER PUBLICATIONS

Interdigital Communications: "Paging Aspects for Multi-Beam Operation", 3GPP Draft; R2-1701193 (NR SI AI 10226) Paging Aspects for Multi-Beam Operation, 3rd Generation Partnership Project (3GPP), Mobile Competence Centre; 650, Route Des Lucioles; F-06921 Sophia-Antipolis, vol. RAN WG2, No. Athens, Greece; Feb. 13, 2017-Feb. 17, 2017, Feb. 4, 2017 (Feb. 4, 2017), pp. 1-3, XP051223413, Retrieved from the Internet: URL: http://www.3gpp.org/ftp/tsg_ran/WG2_RL2/TSGR2_ 97/Docs/ [retrieved on Feb. 4, 2017].
Mediatek Inc: "Paging in NR with Beam Sweeping", 3GPP Draft; R2-1701331 Paging IN NR with Beam Sweeping, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 3, 2017 (Feb. 3, 2017), pp. 1-4, XP051222867, Retrieved from the Internet: URL: http://www.3gpp.org/ftp/tsg_ran/WG2_RL2/TSGR2_ 97/Docs/ [retrieved on Feb. 3, 2017].
International Search Report and Written Opinion—PCT/US2018/017256—ISA/EPO—dated Apr. 19, 2018.

* cited by examiner

PAGING RESPONSE IN BEAMFORMED SYSTEMS

CROSS-REFERENCE TO RELATED APPLICATION(S)

This application claims benefit of U.S. Provisional Application Ser. No. 62/456,404 entitled "PAGING RESPONSE IN BEAMFORMED SYSTEMS" and filed Feb. 8, 2017, which is expressly incorporated by reference herein in its entirety.

BACKGROUND

Aspects of the present disclosure relate generally to wireless communication networks, and more particularly to utilizing feedback from a user equipment (UE) to facilitate transmit beamforming by a base station.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond.

One area of recent improvements has focused on multiple input, multiple output (MIMO) technology that allows communication systems to improve the robustness of data transmission and/or increase data rates. Typically, a MIMO system consists of a plurality of transmit antennas at the transmitter and a plurality of receive antennas at the receiver. In one implementation of the MIMO technique, beamforming permits targeted illumination of specific areas in a coverage cell, which makes it possible to improve transmission to users at the far reaches of cell coverage. Particularly, beamforming uses multiple antennas to control the direction of a wavefront by weighting the magnitude and phase of individual antenna signals (referred to as transmit beamforming). As such, beamforming provides the possibility to direct the beam towards a selected UE.

However, in some situations, for example, when the one or more UEs are in idle mode (e.g., sleep mode) and awake only periodically to listen for paging messages, it may be challenging for the base stations to effectively utilize beamforming to direct a page towards a particular UE. Specifically, because the base station may not be aware of the exact location within its coverage area that the UE may awake to listen for the paging message, the base station generally transmits over multiple directions (referred to as a transmission sweep) in order to ensure that the idle mode UE receives the paging message. However, such transmission sweeps are resource intensive. The resource drainage of the conventional systems are further taxed when the base station needs to transmit a follow-up paging message (e.g., a long paging message) that may include a longer duration transmission, e.g., including a greater number of data packets compared to the initial page (e.g., short paging message), including limited identifying information.

SUMMARY

Aspects of the present disclosure address the above-identified problem by implementing techniques where a base station may transmit a "short-page" message (e.g., paging indicators) to one or more UEs. The short-page message may be decoded by all UEs in the paging cycle and identifies a subset of UEs from the full set of UEs that are paged by the base station. Upon decoding the short page transmitted by the base station, the UE may respond with a "short-page response" to the base station on a transmit beam that offers best signal quality (e.g., low signal-to-noise ratio). Thus, in some examples, the UE, in response to receiving a short paging message, may provide feedback to the base station such that the base station may select a transmit beam for transmission for a subsequent long paging message (and other communications). Based on the feedback ("short-page response") from the one or more UEs, the base station may improve the efficiency of the system by grouping a plurality of UEs to be paged using the same beam in order to maximize the use of available resources.

In one example, a method for wireless communications is disclosed. The method may include transmitting, from a base station, a plurality of short paging messages to a plurality of UEs using a plurality of beams. In response to the transmission of plurality of short paging messages, the base station may receive a plurality of short-page responses from the plurality of UEs that identifies signal quality information for at least one beam from the plurality of beams. The method may include selecting a beam for subsequent communication with at least one UE from the plurality of UEs based on the signal quality information. Accordingly, the method may further include transmitting a message to the at least one UE using the selected beam.

In another example, an apparatus for wireless communications is disclosed. The apparatus may include a memory configured to store instructions and a processor communicatively coupled with the memory. The processor may be configured to execute the instructions to transmit, from a base station, a plurality of short paging messages to a plurality of UEs using a plurality of beams. In response to the transmission of plurality of short paging messages, the processor may receive a plurality of short-page responses from the plurality of UEs that identifies signal quality information for at least one beam from the plurality of beams. The processor may further include instructions to select a beam for subsequent communication with at least one UE from the plurality of UEs based on the signal quality information. Accordingly, the processor may further transmit a message to the at least one UE using the selected beam.

In another example, a method for wireless communication implemented by a UE is disclosed. The method may include receiving, at the UE, a short page message from a base station over a plurality of beams. The method may further include decoding the short page message to determine whether the short page identifies the UE as an intended paging target. The method may further include selecting, for subsequent communication with the base station, a transmit beam from the plurality of beams, and transmitting a response to the base station using the selected beam.

In another example, an apparatus for wireless communications is disclosed. The apparatus may include a memory configured to store instructions and a processor communicatively coupled with the memory. The processor may be configured to execute the instructions to receive, at the UE, a short page message from a base station over a plurality of beams. The instructions may further be executable by the processor to decode the short page message to determine whether the short page identifies the UE as an intended paging target. The instructions may further be executable by the processor to select, for subsequent communication with the base station, a transmit beam from the plurality of beams, and transmitting a response to the base station using the selected beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
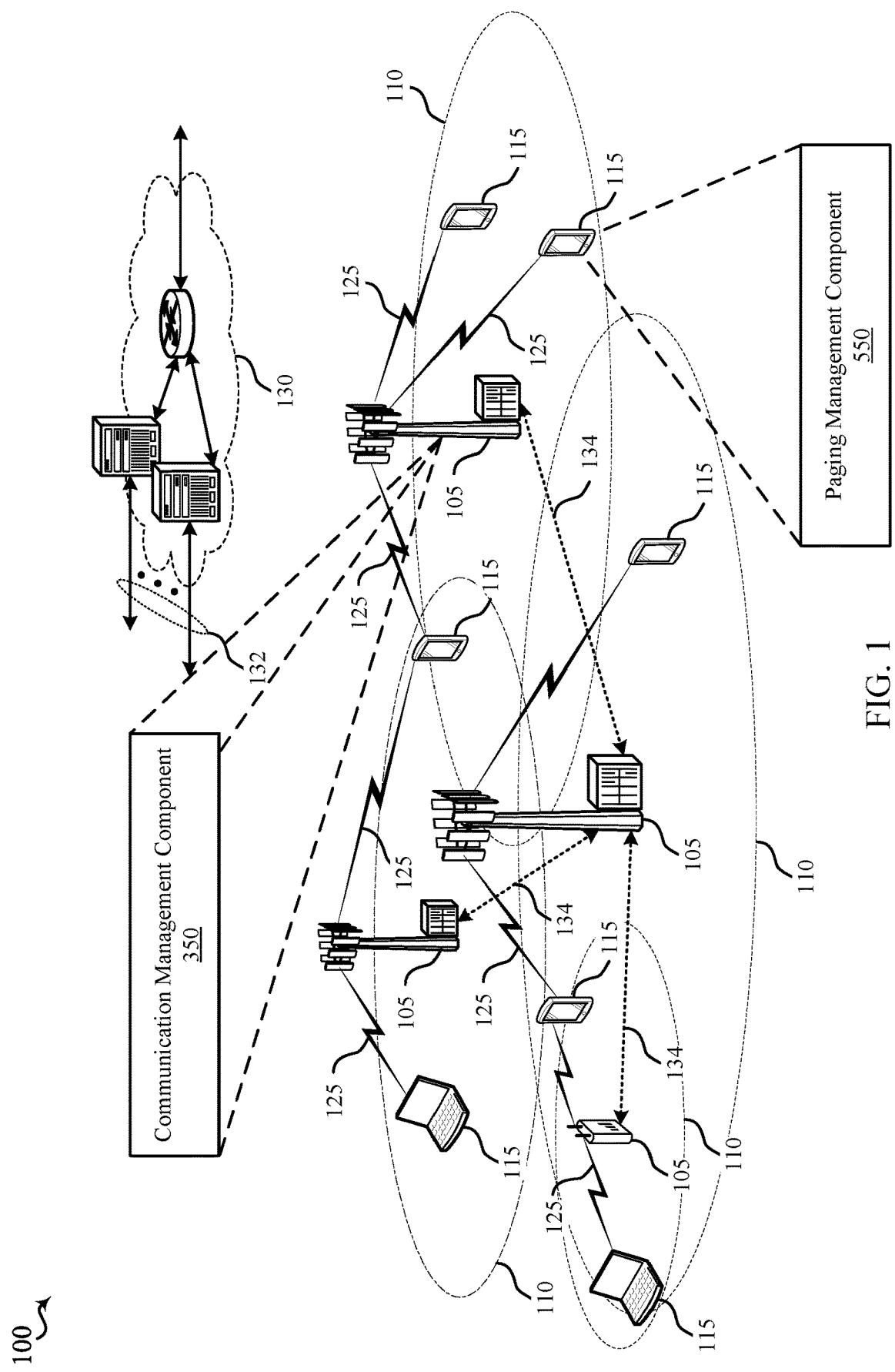
FIG. 1 illustrates an example of a wireless communications system in accordance with aspects of the present disclosure.

As discussed above, in some situations, one or more UEs may be in idle mode (e.g., sleep mode) and awake only periodically to listen for paging messages transmitted by the base station. However, it may be challenging for the base stations to effectively utilize beamforming to direct a page towards a particular UE because the base station may not be aware of the exact location within its coverage area that the UE may awake to listen for the paging message.

In order to account for the uncertainty, the base station generally transmits a short page that includes UE identifying information over multiple directions in order to ensure that the idle mode UE (a UE that may be in power conserve or sleep mode) receives the paging message. However, such transmission sweeps are resource intensive, and utilizing similar transmissions for larger packets (e.g., long paging messages) may adversely impact the resource management of the base station.

Aspects of the present disclosure address the above-identified problem by providing techniques where a base station may transmit a "short-page" message (e.g., paging indicators) to one or more UEs. The short-page message may be decoded by all UEs in the paging cycle and identifies a subset of UEs from the full set of UEs that are paged by the base station. Upon decoding the short page transmitted by the base station, the UE may respond with a "short-page response" to the base station on a transmit beam that offers best signal quality (e.g., low signal-to-noise ratio). Thus, in this manner, the UE, in response to receiving a short paging message, may provide feedback to the base station such that the base station may select a transmit beam for transmission for a subsequent long page message (or other communications).

In one example of the implementation, a base station may transmit a short-page message using beam-sweeping techniques (e.g., transmit over a plurality of beams in multiple directions). Particularly, the beam-sweeping techniques involves the use of a plurality of antenna elements at base station in MIMO systems, such that the resulting beams have narrow beam width. However, the transmission of individual narrow beams may cause poor coverage in some areas as the energy is concentrated over the direction of their main lobes. To cope with that, a beam sweep procedure using phased arrays is generally adopted. During beam-sweeps, the base station sequentially or concurrently transmits individual beams until a certain area of interest is thoroughly scanned. Then, distant points are covered as each beam can radiate energy using an individual transmit power.

The short-page message may be decoded by the all UEs in the paging cycle in order to identify a particular UE that is paged by the base station. The UE, upon detecting that it is the intended recipient of the short-page message, may identify the receiving beam during the beam-sweeping process that offers the greatest signal quality (e.g., low signal-to-noise ratio, transmission power, etc.) and provide such information in a short page response (e.g., feedback) to the base station. Based on the short page response, the base station may transmit a subsequent long paging message using the identified beam direction. It should be appreciated that throughout this disclose, the terms "short-page message" and "short paging message" may be used interchangeably to refer to a paging message transmitted by the base station to identify a particular UE that is paged by the base station. Similarly, the terms "long-page message" or "long paging message" may be used to refer to a paging message (or any subsequent communication) transmitted by the base station to the UE.

Additionally or alternatively, features of the present disclosure provide improvements in efficiency over conventional systems by allowing the base station to group a plurality of UEs to be paged using a single beam (or a subset of beams selected from a full set of available beams) based on the short-page responses received from the plurality of UEs. For example, if a plurality of UEs are clustered close to one another, the base station may be able to improve the system efficiency by using the same beam to concurrently page the plurality of UEs. Thus, for example but not limited hereto, UEs near the cell-center (e.g., near the base station) may be paged together on an omnidirectional beam, and thereby save valuable system resources.

In order to facilitate such grouping, the short-page response from the UE may identify the received signal/beam quality information to allow the base station to make an informed decision in selecting a beam that provides the best signal quality between the base station and the UE (or the group of UEs). In some aspects, the signal/beam quality information may include information such as strength of the received beam among the short page beam-sweeps, strength of a subset of received beams (along with the beam identifier), and strength of a subset of most recently measured synchronization channel beams (along with beam and slot identifier). In some examples, the strength of a subset of the recently measured synchronization channel beams may be reported if the synchronization beam was measured for no more than N slots prior to the current slot, where a value of N may be set by an operator of this system. Particularly, since the base station is aware of the relationship between the synchronization channel and short-page beams, the base station may use this awareness to optimize beam grouping (e.g., decide if the synchronization beam was better than a short-page beam). In some examples, transmit power level of the short-page response can be based on the strength of the "best" received beam utilized for the short paging message. For the purposes of this disclosure, the term "best beam" may refer to one or more beam(s) that offers signal quality that provides comparatively improved performance over the signal quality of a different beam(s). Thus, signal quality may include, but is not limited to, measurements of signal to noise ratio (SNR), signal strength, data rate, quality of service (QoS), reliability, etc. It should further be noted that transmit beam direction is based on the corresponding receive beam for the short page with an assumption of reciprocity (e.g., that the received beam would share the same characteristics of the transmitted beam). If the principle of reciprocity is not available, the UE may use beam-sweeping (e.g., use a plurality of beams) to transmit the short-page response back to the base station.

Techniques of the present disclosure may further facilitate the UE feedback by including resource allocation information in the initial short paging message transmitted by the base station. The resource allocation information may include information related to one or more of time, frequency, bandwidth, DMRS cyclic shift/code, or component carrier (e.g., for cross-carrier allocation). With multiple component carriers, each UE may be configured to listen for short paging messages in a particular component carrier. UEs receiving one (or limited) component carries may be required to be paged by the base station on the one (or limited) component carriers. However, UEs receiving multiple component carriers may have the short paging message consolidated onto a single component carrier, thereby reducing the overhead required for the short paging message.

It should be appreciated that such resource allocation information allows the base station to prevent collisions between a plurality of short-page responses of multiple UEs. However, adding such additional information to a short paging message may also invariably increase the overhead in the short paging message. Thus, in some examples, the size of the short paging message may depend on a number of UEs being paged. The base station may limit uncontrolled expansion of the paging message size by assigning a maximum paging size requirement on any short paging message that is transmitted to the UE. Any incomplete portion of the resource allocation information (e.g., if the short paging message only includes resource information related to time, frequency and bandwidth, but not DMRS cyclic shift/code, or component carrier) may be filled in or determined by the UE based on prior stored configuration information that may inform the UE of the incomplete (or missing) resource allocation information. However, if more than one UE being paged has the same prior configuration, such determination may result in a short-page response collisions when the plurality of UEs transmit the respective short-page responses to the base station. In such situations, the base station may minimize such collisions by avoiding paging UEs in the same paging cycle, at the cost of increased paging latency.

The short-page response transmitted by the UE to the base station may also be an encoded packet. Encoding scheme may be based on preconfigured information, or one or more encoding parameters (e.g., number of beam reports) may be part of resource allocation in the short paging message. This could be quantized to avoid excessive short-page overhead (e.g., "small" vs "large" beam report). The short-page response may also be sequence-based. In other words, the base station may expect a particular sequence(s) from the UE in the response to the transmission of the short paging message. Sequence(s) may be pre-agreed upon (e.g., RRC configured or in MIB/mSIB/SIB). In other examples, multiple sequences may be used to carry information. For example, the UE may choose from a plurality of sequences (e.g., two sequences) in order to indicate whether or not the received beam is stronger than a predetermined reference. The "predetermined reference" may be a fixed RSRP threshold or fixed offset of the strength of the strongest synchronization beam. The network (or base station) may set the predetermined reference threshold/offset such that it can use this indication in order to determine whether UE can be paged on an omnidirectional beam.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 134 (e.g., 51, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some examples, one or more UEs 115 may include an communication management component 250 to perform one or more techniques of the present disclosure. Components and sub-components of the communication management component 250 that perform one or more techniques and methods of providing feedback (e.g., received signal/beam quality information) in a short-page response, and/or determining a transmission beam (e.g., for a long-page) based on the received UE feedback are described in detail with reference to FIG. 2.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, gNodeB, gNB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) or gNB may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100.

Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In the wireless communication network 100, the one or more UEs 115 may either be in a radio resource control (RRC) connected mode or RRC idle mode. During the RRC connected mode, the UEs 115 may maintain an established communication with the base station 105. During the RRC idle mode, the UEs 115 may be in sleep mode without any communication with the base station 105. The sleep mode, for example, may afford the UEs 115 an opportunity to conserve battery power.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

In situations when the UEs 115 are in RRC idle mode, the base station 105 may use a paging process to initiate access the UE 115. The term "paging process" or "paging message" may refer to any control message transmitted by the base station 105 to alert the UE 115 of an existence of a page. Thus, the one or more UEs 115 in RRC idle mode may awake only periodically to listen for paging messages. Because the UEs 115 in the RRC idle mode may only awake periodically, it may be challenging for the base stations 105 to effectively utilize beamforming to direct a page towards a particular UE 115. Specifically, because the base station may not be aware of the exact location or cell in which the UE 115 may awake to listen for the paging message, the base station 105 generally transmits over multiple directions (referred to as a transmission sweep) in order to ensure that the idle mode UE receives the paging message. However, as discussed above, such transmission sweeps are resource intensive.

Aspects of the present disclosure address the above-identified problem by providing techniques for a communication management component 350 of a base station 105 to transmit a "short-page" message (e.g., paging indicators) to one or more UEs 115. The short-page message may be decoded by all UEs in the paging cycle and identifies a subset of UEs from the full set of UEs that are paged by the base station. Upon decoding the short page transmitted by the base station 105, the paging management component 550 of the UE 115 may respond with a "short-page response" to the base station on a transmit beam that offers best signal quality (e.g., low signal-to-noise ratio). Thus, in this manner, the paging management component 550 of the UE 115, in response to receiving a short paging message, may provide feedback to the base station 105 such that the base station 105 may select a transmit beam for transmission for a subsequent long page message (or other communications). Features of the communication management component 350 of the base station 105 and the paging management component 550 of the UE 115 are described in more detail below.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2A:
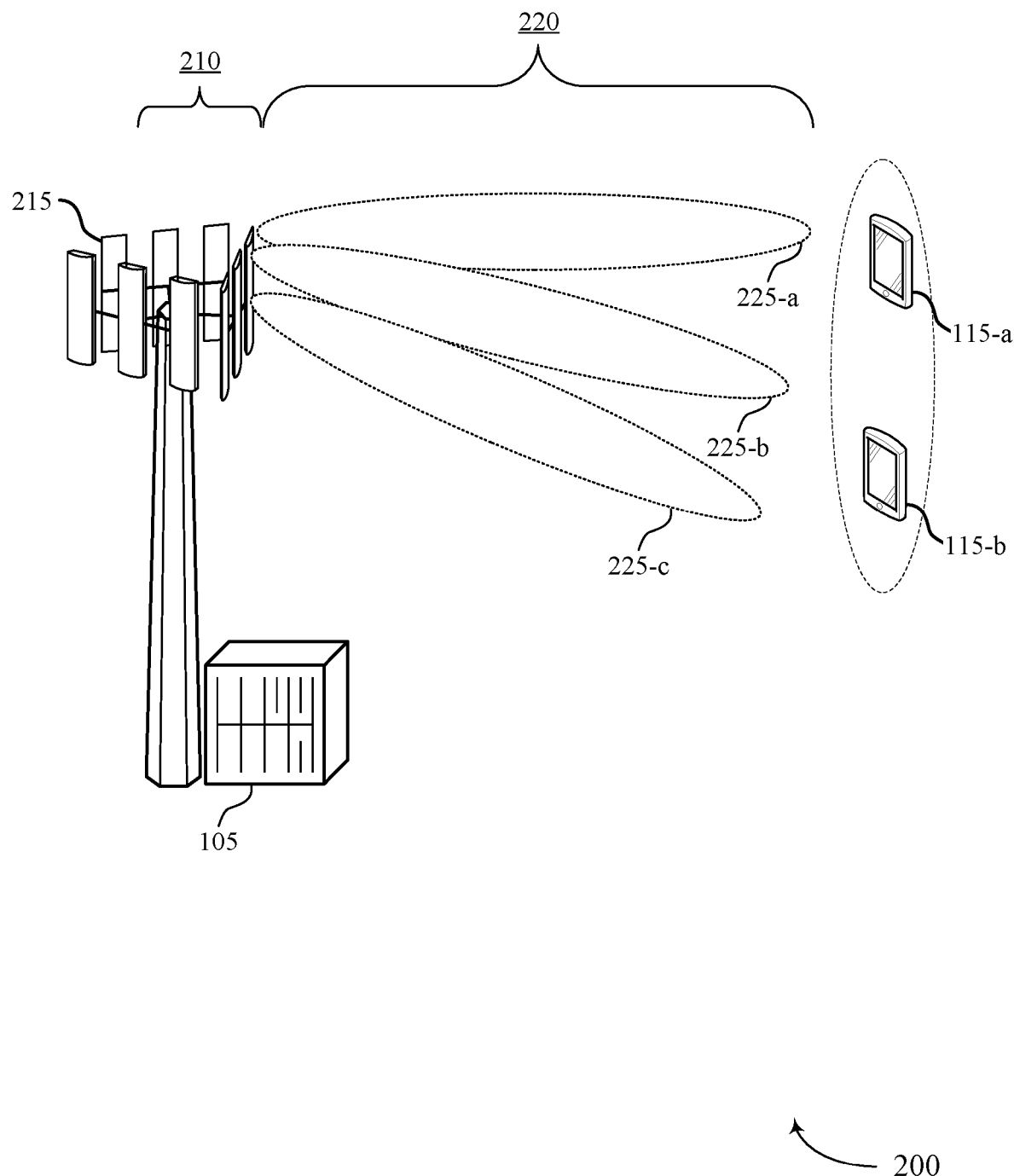
FIG. 2A illustrates a schematic diagram that supports a beamforming array in accordance with aspects of the present disclosure.

FIG. 2A shows a schematic diagram 200 that supports a beamforming array in accordance with aspects of the present disclosure. In some examples, the base station 105 and the UE 115 may be examples of the base station and UE described above with reference to FIG. 1.

In some examples, the base station 104 may include a beamforming array 210 that incorporates a plurality of antennas 215 to implement a plurality of beams 225 used to establish communication with the UE 115. Beamforming is a technique for directional signal transmission and reception. Beamforming at a transmitter may involve phase-shifting the signal produced at different antennas 215 in an array to focus a transmission in a particular direction. The phase-shifted signals may interact to produce constructive interference in certain directions and destructive interference in other directions. By focusing the signal power, a transmitter (e.g., base station 105) may improve communication throughput while reducing interference with neighboring transmitters.

Similarly, beamforming at a receiver (e.g., UE 115) may involve phase-shifting a signal received at different antennas (not shown) of the UE 115. When combining the phase shifted signals, the UE 115 may amplify a signal from certain directions and reduce the signal from other directions. In some cases, receivers and transmitters may utilize beamforming techniques independently of each other. In other cases, a transmitter and receiver may coordinate to select a beam 225 direction. The use of beamforming may depend on factors such as the type of signal being transmitted and the channel conditions. For example, directional transmissions may not be useful when transmitting to multiple receivers, or when the location of the receiver is unknown. Thus, beamforming may be appropriate for unicast transmissions, but may not be useful for broadcast transmissions. Also, beamforming may be appropriate when transmitting in a high frequency radio band, such as in the millimeter waveform (MMW) band.

Since the beamforming array 210 size is proportional to the signal wavelength, smaller devices may be capable of beamforming in high frequency bands. Also, the increased receive power may compensate for the increased path loss at these frequencies. In some examples, beamforming pattern 220 may include one or more beams 225, which may be identified by individual beam IDs.

In one example of the present implementation, a base station 105 may transmit a short-page message using beam-sweeping techniques (e.g., transmit over a plurality of beams 225 in multiple directions). Particularly, the beam-sweeping techniques involves the use of a plurality of antennas 215 at base station in MIMO systems, such that the resulting beams 225 have narrow beam width. During beam-sweeps, the base station 105 may sequentially or concurrently transmits individual beams 225 until a certain area of interest is thoroughly scanned. Then, distant points are covered as each beam 225 can radiate energy using an individual transmit power.

The short-page message transmitted by the base station 105 using beamforming may be decoded by UEs 115 (e.g., first UE 115-a and second UE 115-b) in the paging cycle in order to identify a particular UE (e.g., first UE 115-a) that is paged by the base station. The first UE 115-a, upon detecting that it is the intended recipient of the short-page message, may identify the receiving beam 225 (e.g., first beam 225-a) during the beam-sweeping process that offers the greatest signal quality (e.g., low signal-to-noise ratio, transmission power, etc.) and provide such information in a short page response (e.g., feedback) back to the base station 105. Based on the short page response, the base station 105 may transmit a subsequent long paging message using the identified beam direction 225-a.

Figure 2B:
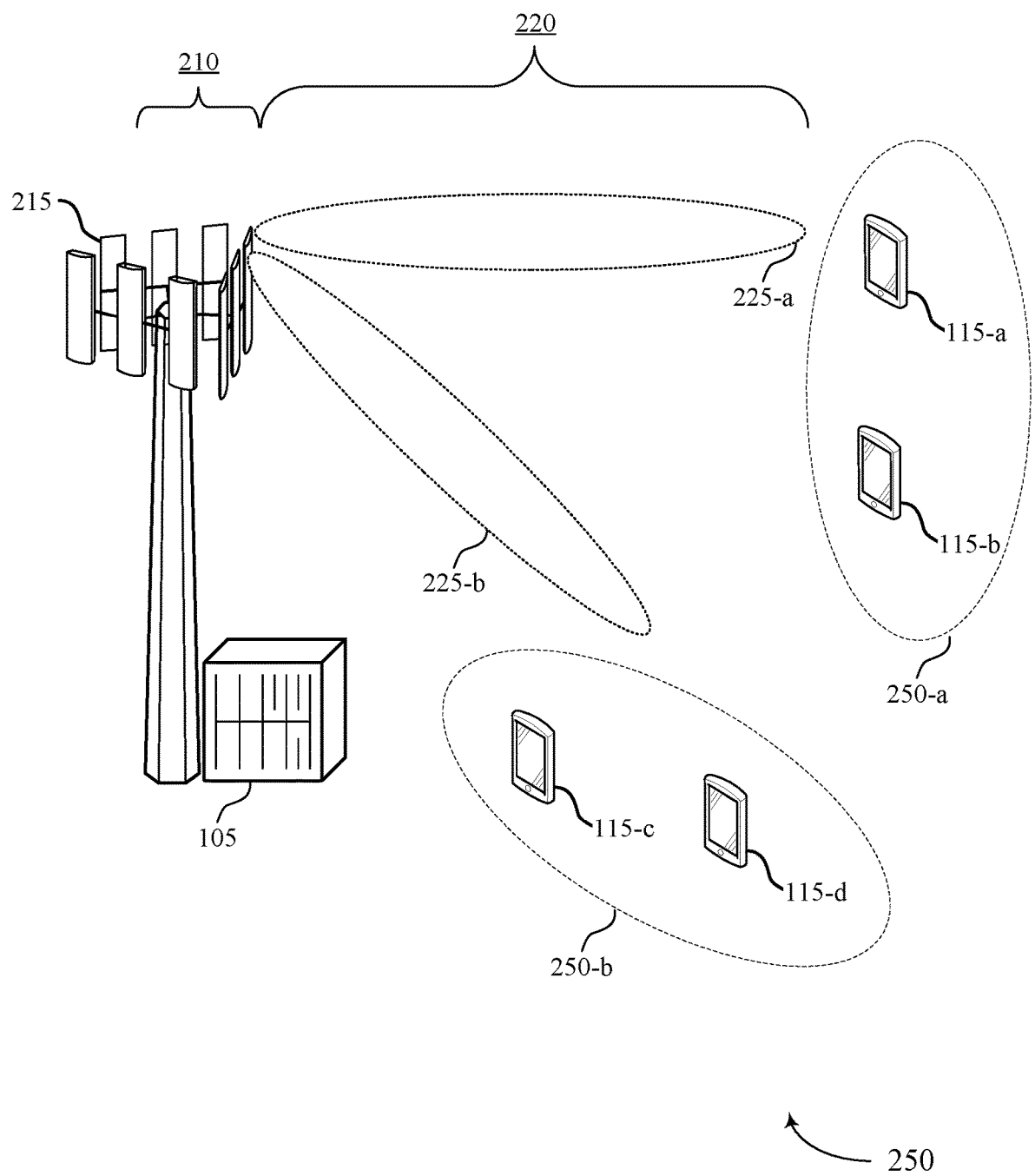
FIG. 2B illustrates a system that allows the base station to group a plurality of UEs to be paged using a single beam based on the short-page in accordance with aspects of the present disclosure.

Further, as illustrated in the schematic diagram 250 of FIG. 2B, features of the present disclosure provide improvements in efficiency over conventional systems by allowing the base station 105 to group a plurality of UEs 115 to be paged using a single beam (or a subset of beams selected from a full set of available beams) based on the short-page responses received from the plurality of UEs 115. For example, if a first set of plurality of UEs 115 (e.g., first UE 115-a and second UE 115-b) are clustered close to one another, the base station 105 may associate the first UE 115-a and second UE 115-b to a first group 250-a, and a second set of plurality of UEs 115 (e.g., third UE 115-c and fourth UE 115-d) that are separately clustered together to a second group 250-b.

In this instance, the base station 105 may use a first beam 225-a (or first set of beams) to concurrently page the first UE 115-a and second UE 115-b in the first group 250-a, while using a second beam 225-b (or a second set of beams) to concurrently page the third UE 115-c and fourth UE 115-d in the second group 250-b.

In order to facilitate such grouping, the short-page response from the plurality of UEs 115 may identify the received signal/beam quality information to allow the base station 105 to make an informed decision in selecting a beam 225 that provides the best signal quality between the base station 105 and the UE 115 (or the group of UEs). As explained above, the signal/beam quality information may include information such as strength of the received beam among the short page beam-sweeps, strength of a subset of received beams (along with the beam identifier), and strength of a subset of most recently measured synchronization channel beams (along with beam and slot identifier).

In some examples, the strength of a subset of the recently measured synchronization channel beams may be reported if the synchronization beam was measured for no more than N slots prior to the current slot, where a value of N may be set by an operator of this system. Particularly, since the base station 105 is aware of the relationship between the synchronization channel and short-page beams, the base station 105 may use this awareness to optimize beam grouping (e.g., decide if the synchronization beam was better than a short-page beam). It should be noted that transmit beam direction is based on the corresponding receive beam for the short page with an assumption of reciprocity (e.g., that the received beam would share the same characteristics of the transmitted beam). If the principle of reciprocity is not available, the UE may use beam-sweeping (e.g., use a plurality of beams) to transmit the short-page response back to the base station.

Thus, techniques of the present disclosure may further facilitate the UE 115 feedback by including resource allocation information in the initial short paging message transmitted by the base station. The resource allocation information may include information related to one or more of time, frequency, bandwidth, DMRS cyclic shift/code, or component carrier (e.g., for cross-carrier allocation). With multiple component carriers, each UE 115 may be configured to listen for short paging messages in a particular component carrier. UEs 115 receiving one (or limited) component carries may be required to be paged by the base station on the one (or limited) component carriers. However, UEs 115 receiving multiple component carriers may have the short paging message consolidated onto a single component carrier, thereby reducing the overhead required for the short paging message.

It should be appreciated that such resource allocation information allows the base station 105 to prevent collisions between a plurality of short-page responses of multiple UEs 115. However, adding such additional information to a short paging message may also invariably increase the overhead in the short paging message. Thus, in some examples, the size of the short paging message may depend on a number of UEs 115 being paged. The base station 105 may limit uncontrolled expansion of the paging message size by assigning a maximum paging size requirement on any short paging message that is transmitted to the UE. Any incomplete portion of the resource allocation information (e.g., if the short paging message only includes resource information related to time, frequency and bandwidth, but not DMRS cyclic shift/code, or component carrier) may be filled in or determined by the UE 115 based on prior stored configuration information that may inform the UE 115 of the incomplete (or missing) resource allocation information. However, if more than one UE 115 being paged has the same prior configuration, such determination may result in a short-page response collisions when the plurality of UEs transmit the respective short-page responses to the base station 105. In such situations, the base station 105 may minimize such collisions by avoiding paging UEs in the same paging cycle, at the cost of increased paging latency.

The short-page response transmitted by the UE 115 to the base station 105 may also be an encoded packet. Encoding scheme may be based on preconfigured information, or one or more encoding parameters (e.g., number of beam reports) may be part of resource allocation in the short paging message. This could be quantized to avoid excessive short-page overhead (e.g., "small" vs "large" beam report). The short-page response may also be sequence-based. In other words, the base station may expect a particular sequence(s) from the UE in the response to the transmission of the short paging message. Sequence(s) may be pre-agreed upon (e.g., RRC configured or in MIB/mSIB/SIB). In other examples, multiple sequences may be used to carry information. For example, the UE 115 may choose from a plurality of sequences (e.g., two sequences) in order to indicate whether or not the received beam is stronger than a predetermined reference. The "predetermined reference" may be a fixed RSRP threshold or fixed offset of the strength of the strongest synchronization beam. The network (or base station 105) may set the predetermined reference threshold/offset such that it can use this indication in order to determine whether UE 115 can be paged on an omnidirectional beam.

Figure 3:
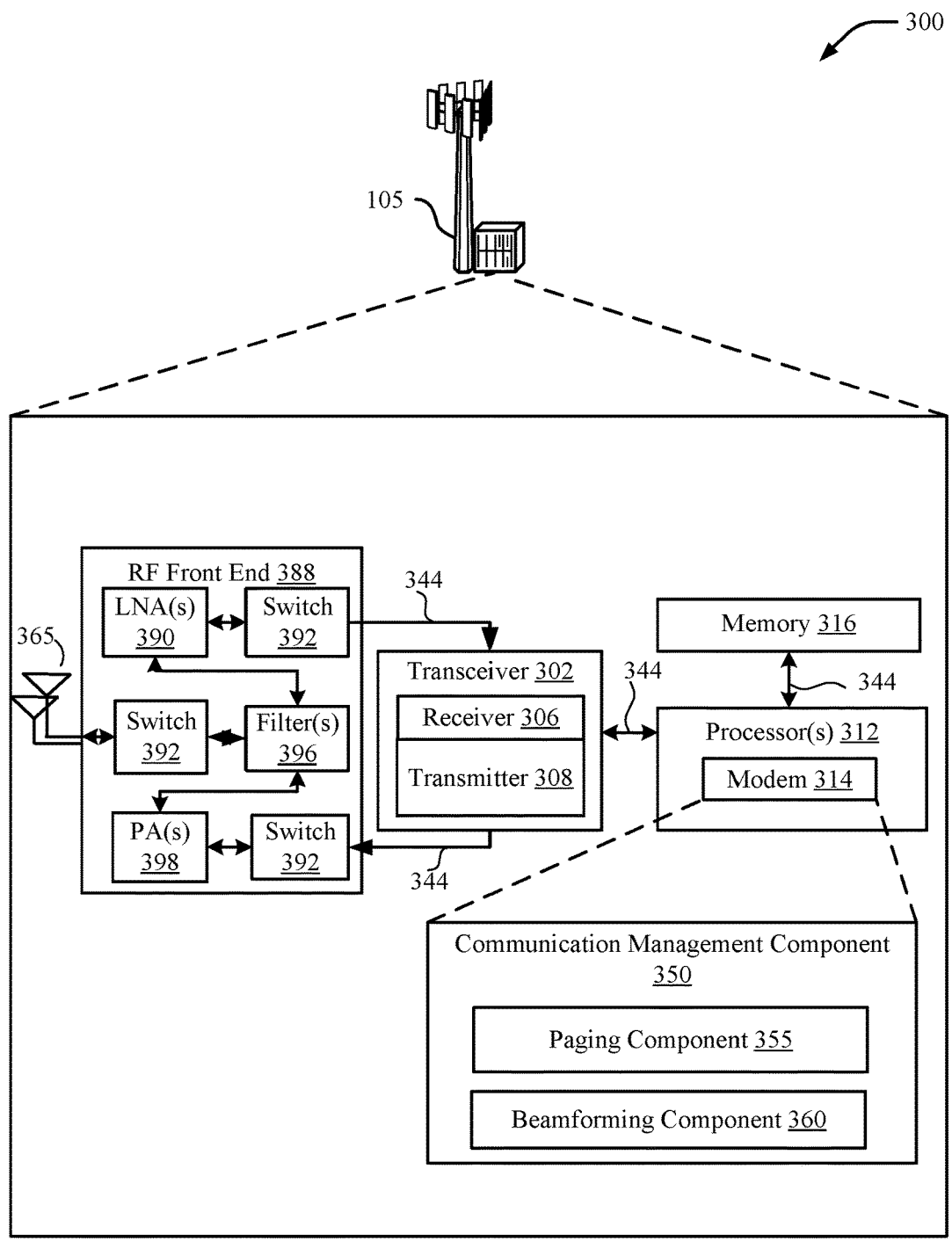
FIG. 3 is a schematic diagram of an aspect of an implementation of various components of a transmitting device (e.g., base station) in accordance with various aspects of the present disclosure.

FIG. 3 describes hardware components and subcomponents of a device that may be a transmitting device (e.g., a base station 105) for implementing one or more methods (e.g., method 400) described herein in accordance with various aspects of the present disclosure. For example, one example of an implementation of the transmitting device may include a variety of components, some of which have already been described above, but including components such as one or more processors 312 and memory 316 and transceiver 302 in communication via one or more buses 344, which may operate in conjunction with the communication management component 350 to process the feedback received from UE 115 in selecting a beam from a plurality of beams for subsequent transmissions with the UE 115. In some examples, the communication management component 350 may include a paging component 355 to generate one or more paging messages (e.g., short paging message and/or long paging message) and a beamforming component 360 for generating beams, including omnidirectional transmissions, that take advantage of multi-path environments to transmit multiple spatial layers carrying the same or different coded data. Thus, the communication management component 350 may perform functions described herein related to including one or more methods of the present disclosure.

The one or more processors 312, modem 315, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

Also, memory 316 may be configured to store data used herein and/or local versions of applications or communication management component 350 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communication management component 350 and/or one or more of its subcomponents, and/or data associated therewith, when base station 105 is operating at least one processor 312 to execute communication management component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one UE 115. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 388, which may operate in communication with one or more antennas 365 and transceiver 302 for receiving and transmitting radio transmissions, for example, wireless communications transmitted by at least one base station 105 or wireless transmissions transmitted by UE 115. RF front end 288 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that transmitting device can communicate with, for example, one or more base stations 105 or one or more cells associated with one or more base stations 105. In an aspect, for example, modem 314 can configure transceiver 302 to operate at a specified frequency and power level based on the configuration of the transmitting device and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of transmitting device (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 4:
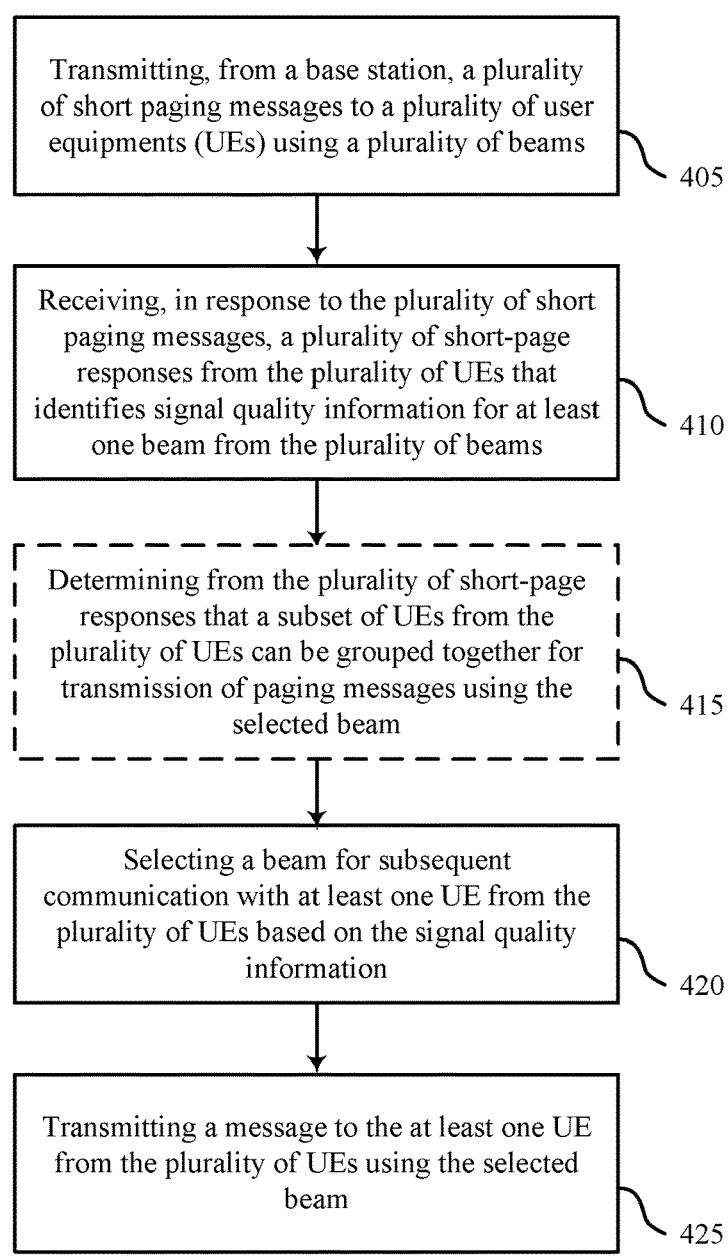
FIG. 4 illustrates a method of wireless communication in accordance with aspects of the present disclosure.

FIG. 4 is a flowchart of an example method 400 for utilizing UE feedback for beamforming at the base station in a wireless communications system in accordance with aspects of the present disclosure. The method 400 may be performed using an apparatus (e.g., the base station 105). Although the method 300 is described below with respect to the elements of the transmitting device (e.g., the base station 105), other components may be used to implement one or more of the steps described herein.

At block 405, the method may include transmitting, from a base station, a plurality of short paging messages to a plurality of UEs using a plurality of beams. In some examples, the transmission of short paging messages may employ a beam-sweeping technique that transmits a plurality of beams in multiple directions in order to ensure that the plurality of UEs receive the paging message. In one example, the short paging messages may be directed to UEs in idle mode (e.g., sleep mode). The UEs may awake periodically to listen for paging messages where the particular UE is an intended recipient of the paging message. If the UE determines, based on the short paging message, that the page was intended for that UE, the UE may stay awake in order to receive subsequent messages. In one or more examples, the short paging messages may additionally include resource allocation information to be utilized by the plurality of UEs in responding to the short paging messages. The resource allocation information may include information related to one or more of time, frequency, bandwidth, DMRS cyclic shift/code, or component carrier (e.g., for cross-carrier allocation). Further, the base station may determine a total number of UEs that will be recipients of the short paging message. Thus, the base station may generate the short paging message such that the size of the shot paging message is based on the total number of UEs. Aspects of block 405 may be performed by the paging component 355 and transceiver 302 described with reference to FIG. 3.

At block 410, the method may include receiving, in response to the plurality of short paging messages, a plurality of short-page responses from the plurality of UEs that identifies signal quality information for at least one beam from the plurality of beams. In some aspects, the signal quality information may include information associated with a channel or beam such as strength of the best received beam among the short page beam-sweeps, strength of a subset of received beams (along with the beam identifier), and strength of a subset of most recently measured synchronization channel beams (along with beam and slot identifier). In some examples, the strength of a subset of the recently measured synchronization channel beams may be reported only if the synchronization beam was measured not more than N slots prior to the current slot. The transmit power level of the short-page response may be based on the strength of the best received beam from the plurality of beams used for the short paging message. Aspects of block 410 may be performed by the transceiver 302 described with reference to FIG. 3.

At block 415, the method may optionally include determining from a plurality of short-range responses that a subset of UEs from the plurality of UEs can be grouped together for transmission of paging messages using the selected beam. Aspects of block 415 may be performed by the beamforming component 360 described with reference to FIG. 3.

At block 420, the method may include selecting a beam for subsequent communication with at least one UE from the plurality of UEs based on the signal quality information. In some examples, the beam may be selected from a plurality of transmitted beams based on information provided in the short-page response that identifies the beam that offers the greatest signal quality to the UE. As such, in subsequent transmissions, the base station may limit transmitting a plurality of beams in multiple directions in order to target a specific UE. Such technique may conserve valuable power and bandwidth resources at the base station. Aspects of block 420 may be performed by the beamforming component 360 described with reference to FIG. 3.

At block 425, the method may include transmitting a message to the at least one UE using the selected beam. In some examples, the message transmitted to the at least one UE using the selected beam may be a long paging message. However, it should be appreciated that the response message is not limited to a "long paging message," but may include any message transmitted in response to the paging message received from the base station. The long paging message may include additional information than the short paging message, and thus may also be greater size in comparison to the short paging message. Although the present disclosure is described with reference to various paging messages, it should be appreciated that the techniques described herein may be used for any type of transmission that is not limited to paging. In some examples, the base station may group a plurality of UEs to be paged on the same beam based on the short-page responses. In particular, UEs that may be clustered together or near cell-center may be paged together on an omnidirectional beam. In some examples, transmitting may include transmitting a plurality of long paging messages to the plurality of UEs that are grouped together using the selected beam (e.g., omnidirectional beam). Thus, multiple UEs may be targeted using the same beam. In some example, in order to avoid collisions, the base station may transmit a paging message to the multiple UEs during different paging cycles. Aspects of block 425 may be performed by the transceiver 302 described with reference to FIG. 3.

Figure 5:
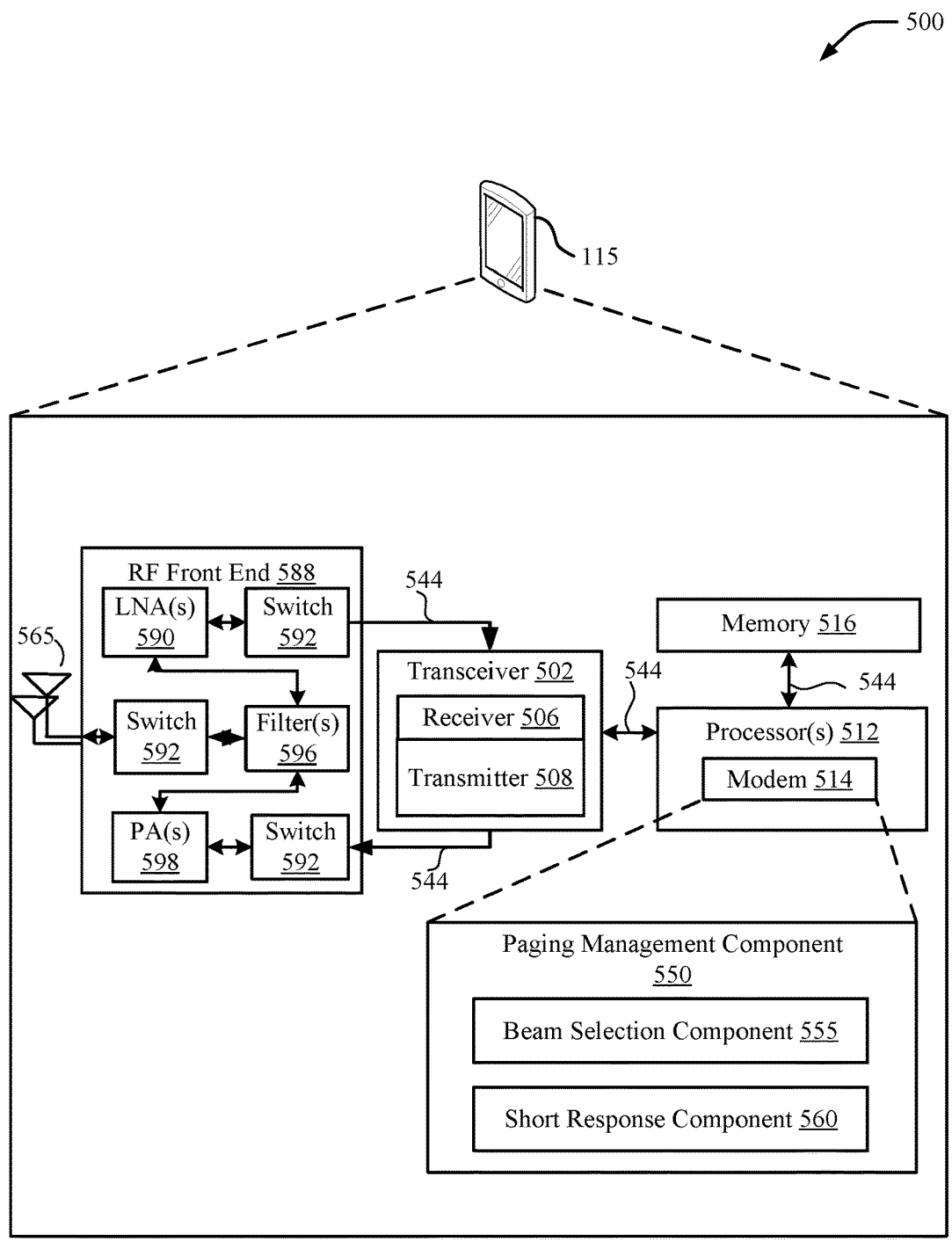
FIG. 5 is a schematic diagram of an aspect of an implementation of various components of a receiving device (e.g., UE) in accordance with various aspects of the present disclosure.

FIG. 5 describes hardware components and subcomponents of a device that may be a receiving device (e.g., a UE 115) for implementing one or more methods (e.g., method 500) described herein in accordance with various aspects of the present disclosure. For example, one example of an implementation of the transmitting device may include a variety of components, some of which have already been described above, but including components such as one or more processors 512 and memory 516 and transceiver 502 in communication via one or more buses 544, which may operate in conjunction with the paging management component 550 to process the short page message received from the base station 105 and generate short page response by selecting a beam from a plurality of beams for subsequent transmissions. In some examples, the paging management component 550 may include a beam selection component 555 for identifying a transmit beam from a plurality of beam candidates to conduct subsequent communication and short response component 560 to generate one or more short page responses that identifies the signal quality of one or more transmit beams. Thus, the paging management component 550 may perform functions described herein related to including one or more methods of the present disclosure.

The one or more processors 512, modem 515, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to paging management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with paging management component 550 may be performed by transceiver 502.

Also, memory 516 may be configured to store data used herein and/or local versions of applications or paging management component 550 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining paging management component 550 and/or one or more of its subcomponents, and/or data associated therewith, when UE 115 is operating at least one processor 512 to execute paging management component 550 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one UE 115. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 588, which may operate in communication with one or more antennas 565 and transceiver 502 for receiving and transmitting radio transmissions, for example, wireless communications transmitted by at least one base station 105 or wireless transmissions transmitted by UE 115. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 388 may use one or more switches 592 to select a particular LNA 390 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that transmitting device can communicate with, for example, one or more base stations 105 or one or more cells associated with one or more base stations 105. In an aspect, for example, modem 314 can configure transceiver 502 to operate at a specified frequency and power level based on the configuration of the transmitting device and the communication protocol used by modem 514.

In an aspect, modem 514 can be a multiband-multimode modem, which can process digital data and communicate with transceiver 502 such that the digital data is sent and received using transceiver 502. In an aspect, modem 514 can be multiband and be configured to support multiple frequency bands for a specific communications protocol. In an aspect, modem 514 can be multimode and be configured to support multiple operating networks and communications protocols. In an aspect, modem 514 can control one or more components of transmitting device (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 6:
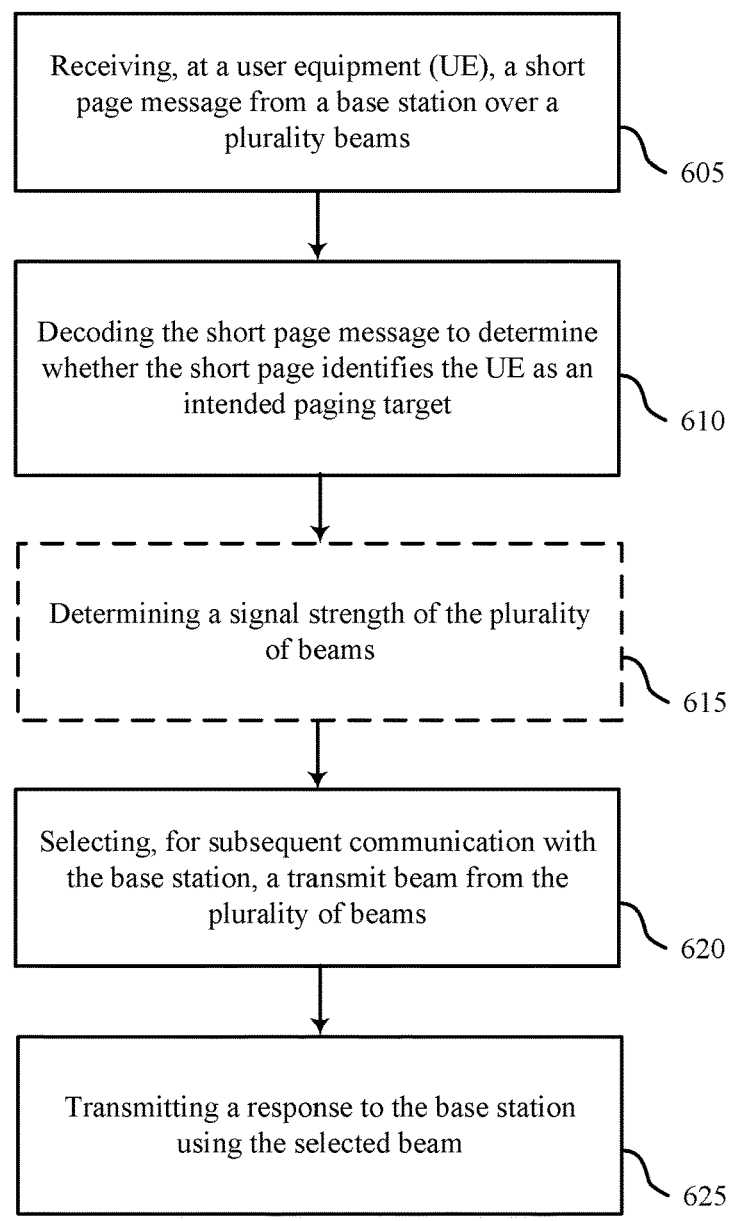
FIG. 6 is a flowchart of an example method implemented by the UE for responding to a short page message from the base station in a wireless communications system in accordance with aspects of the present disclosure.

FIG. 6 is a flowchart of an example method 600 implemented by a UE for responding to a short page message from the base station in a wireless communications system in accordance with aspects of the present disclosure. The method 600 may be performed using an apparatus (e.g., the UE 115). Although the method 600 is described below with respect to the elements of the UE 115, other components may be used to implement one or more of the steps described herein.

At block 605, the method may include receiving, at a user equipment (UE), a short page message from a base station over a plurality of beams. In some examples, the short page message may be received during a paging cycle. The short page message may include a paging indicator that identifies the intended target UE 115 for the page. Further, in some examples, the short page message may include resource allocation information in the initial short paging message transmitted by the base station. The resource allocation information may include information related to one or more of time, frequency, bandwidth, DMRS cyclic shift/code, or component carrier (e.g., for cross-carrier allocation). With multiple component carriers, each UE may be configured to listen for short paging messages in a particular component carrier. In some examples, the short page message may include information associated with a short-page response resource allocation such that transmission of the short-page response is transmitted on resources identified in the short-page resource allocation. Aspects of block 605 may be performed by the transceiver 502 described with reference to FIG. 5.

At block 610, the method may include decoding the short page message to determine whether the short page identifies the UE as an intended paging target. The UE, upon detecting that it is the intended recipient of the short-page message, may identify the receiving beam during the beam-sweeping process that offers the greatest signal quality (e.g., low signal-to-noise ratio, transmission power, etc.) and provide such information in a short page response (e.g., feedback) to the base station. Aspects of block 610 may be performed by the paging management component 550 described with reference to FIG. 5.

At block 615, the method may include determining a signal strength of the plurality of beams. In some examples, determining the signal strength of the plurality of beams may include determining that the signal strength of the transmit beam from the plurality of beams exceeds a reference threshold. Additionally or alternatively, the method may include determining a signal strength of a subset of recently measured synchronization channel and selecting the transmit beam based on its determination. Aspects of block 615 may be performed by the beam selection component 555 described with reference to FIG. 5.

At block 620, the method may include selecting, for subsequent communication with the base station, a transmit beam from the plurality of beams. In some examples, the transmit beam selected for subsequent communication may provide comparatively improved performance over the signal quality of a different beam(s). Thus, signal quality may include, but is not limited to, measurements of SNR, signal strength, data rate, QoS, reliability, etc. It should further be noted that transmit beam direction is based on the corresponding receive beam for the short page with an assumption of reciprocity (e.g., that the received beam would share the same characteristics of the transmitted beam). If the principle of reciprocity is not available, the UE may use beam-sweeping (e.g., use a plurality of beams) to transmit the short-page response back to the base station. In other examples, the selecting the beam may include identifying the beam for transmission based on sequence of the short page responses where the sequence of the short page response may identify whether the beam is stronger or weaker than a preconfigured reference. The preconfigured reference may be one or more of fixed RSRP threshold or fixed offset of a strength of strongest synchronization beam. Aspects of block 610 may be performed by the beam selection component 555 described with reference to FIG. 5.

At block 625, the method may include transmitting a response to the base station using the selected beam. In some examples, the response transmitted to the base station using the selected beam may be a "short paging response." However, it should be appreciated that the response is not limited to a short paging response, but may include any response transmitted by the UE in response to the paging message from the base station. The short-page response transmitted by the UE to the base station may also be an encoded packet. Encoding scheme may be based on preconfigured information, or one or more encoding parameters (e.g., number of beam reports) may be part of resource allocation in the short paging message. Aspects of block 605 may be performed by the transceiver 502 described with reference to FIG. 5.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   transmitting, from a base station, a plurality of short paging messages to a plurality of user equipments (UEs) using a plurality of beams;
   receiving, in response to the plurality of short paging messages, a plurality of short-page responses from the plurality of UEs that identifies signal quality information for at least one beam from the plurality of beams;
   selecting a beam based, at least in part, on the signal quality information from the plurality of short-page responses, for subsequent communication with a subset of UEs from the plurality of UEs; and
   transmitting at least one message to at least one UE of the subset of UEs using the selected beam, the at least one message comprising at least one long paging message.

2. The method of claim 1, wherein selecting the beam further comprises:
   determining, based on the signal quality information from the plurality of short-page responses, that the subset of UEs can be grouped together for transmission of paging messages using the selected beam;
   wherein the transmitting includes transmitting a plurality of long paging messages to the plurality of UEs using the selected beam, wherein the plurality of long paging messages include the at least one long paging message.

3. The method of claim 1, wherein the signal quality information includes one or more of:
   signal strength of a received beam from the plurality of beams;
   signal strength of a subset of beams from the plurality of beams; or
   signal strength of a subset of recently measured synchronization channel beams.

4. The method of claim 1, wherein transmitting the plurality of short paging messages to the plurality of UEs comprises:
   determining a total number of UEs that will be recipients of the short paging message; and
   generating the short paging message such that size of the short paging message is based on the total number of UEs that will be recipients of the short paging message.

5. The method of claim 1, wherein the plurality of short paging messages include information associated with a short-page response resource allocation.

6. An apparatus for wireless communications, comprising:
   a transceiver;
   memory;
   a processor communicatively coupled with the transceiver and the memory, and configured to:
      transmit, via the transceiver, a short paging message to a user equipment (UE) using a plurality of beams in a plurality of directions;
      receive, via the transceiver, in response to the short paging message, a sequence of short-page responses from the UE comprising signal quality information for a beam from the plurality of beams indicating that the beam is stronger than a preconfigured reference;

select the beam identified by the sequence of short-page responses for subsequent communication with the UE; and transmit, via the transceiver, a message to the UE on the selected beam.

7. The apparatus of claim 6, wherein the signal quality information includes one or more of:

signal strength of a received beam from the plurality of beams;

signal strength of a subset of beams from the plurality of beams; or signal strength of a subset of recently measured synchronization channel beams.

8. The apparatus of claim 6, wherein the processor is further configured to:

determine a total number of UEs that will be recipients of the short paging message; and generate the short paging message such that size of the short paging message is based on the total number of UEs that will be recipients of the short paging message.

9. The apparatus of claim 6, wherein the short paging message includes information associated with a short-page response resource allocation.

10. The apparatus of claim 6, wherein the preconfigured reference comprises a fixed reference signal received power (RSRP) threshold or a fixed offset of a strength of strongest synchronization beam.

11. The apparatus of claim 6, wherein the message transmitted to the UE using the selected beam is a long page message.

12. An apparatus for wireless communications, comprising:

a transceiver;

memory;

a processor communicatively coupled with the transceiver and the memory and configured to:

transmit, via the transceiver, a plurality of short paging messages to a plurality of user equipments (UEs) using a plurality of beams;

receive, via the transceiver, in response to the plurality of short paging messages, a plurality of short-page responses from the plurality of UEs that identifies signal quality information for at least one beam from the plurality of beams;

select a beam based, at least in part, on the signal quality information from the plurality of short-page responses, for subsequent communication with a subset of UEs from the plurality of UEs; and transmit via the transceiver, at least one message to at least one UE of the subset of UEs using the selected beam, the at least one message comprising at least one long paging message.

13. The apparatus of claim 12, wherein the processor is further configured to:

determine, based on the signal quality information from the plurality of short-page responses, that the subset of UEs can be grouped together for transmission of paging messages using the selected beam; and transmit via the transceiver, a plurality of long paging messages to the plurality of UEs using the selected beam, wherein the plurality of long paging messages include the at least one long paging message.

14. The apparatus of claim 12, wherein the signal quality information includes one or more of:

signal strength of a received beam from the plurality of beams;

signal strength of a subset of beams from the plurality of beams; or signal strength of a subset of recently measured synchronization channel beams.

15. The apparatus of claim 12, wherein the processor is further configured to:

determine a total number of UEs that will be recipients of the short paging message, and wherein a size of at least one short paging message of the plurality of short paging messages is based on the total number.

16. The apparatus of claim 12, wherein the plurality of short paging messages include information associated with a short-page response resource allocation.

17. An apparatus for wireless communications, comprising:

means for transmitting a plurality of short paging messages to a plurality of user equipments (UEs) using a plurality of beams;

means for receiving, in response to the plurality of short paging messages, a plurality of short-page responses from the plurality of UEs that identifies signal quality information for at least one beam from the plurality of beams;

means for selecting a beam based, at least in part, on the signal quality information from the plurality of short-page responses, for subsequent communication with a subset of UEs from the plurality of UEs; and means for transmitting at least one message to at least one UE of the subset of UEs using the selected beam, the at least one message comprising at least one long paging message.

18. The apparatus of claim 17, and further comprising:

means for determining, based on the signal quality information from the plurality of short-page responses, that the subset of UEs can be grouped together for transmission of paging messages using the selected beam; and means for transmitting a plurality of long paging messages to the plurality of UEs using the selected beam, wherein the plurality of long paging messages include the at least one long paging message.

19. A method for wireless communications, comprising:

transmitting a short paging message to a user equipment (UE) using a plurality of beams in a plurality of directions;

receiving, in response to the short paging message, a sequence of short-page responses from the UE comprising signal quality information for a beam from the plurality of beams indicating that the beam is stronger than a preconfigured reference;

selecting the beam identified by the sequence of short-page responses for subsequent communication with the UE; and transmitting a message to the UE on the selected beam.

20. The method of claim 19, wherein the signal quality information includes one or more of:

signal strength of a received beam from the plurality of beams;

signal strength of a subset of beams from the plurality of beams; or signal strength of a subset of recently measured synchronization channel beams.

21. The method of claim 19, and further comprising:

determining a total number of UEs that will be recipients of the short paging message; and generating the short paging message such that size of the short paging message is based on the total number of UEs that will be recipients of the short paging message.

22. The method of claim 19, wherein the short paging message includes information associated with a short-page response resource allocation.

23. The method of claim 19, wherein the preconfigured reference comprises a fixed reference signal received power (RSRP) threshold or a fixed offset of a strength of strongest synchronization beam.

24. The method of claim 19, wherein the message transmitted to the UE using the selected beam is a long page message.

25. An apparatus for wireless communications, the apparatus comprising:
   means for transmitting a short paging message to a user equipment (UE) using a plurality of beams in a plurality of directions;
   means for receiving, in response to the short paging message, a sequence of short-page responses from the UE comprising signal quality information for a beam from the plurality of beams indicating that the beam is stronger than a preconfigured reference;
   means for selecting the beam identified by the sequence of short-page responses for subsequent communication with the UE; and
   means for transmitting a message to the UE on the selected beam.

26. The apparatus of claim 25, and further comprising:
   means for determining a total number of UEs that will be recipients of the short paging message; and
   means for generating the short paging message such that size of the short paging message is based on the total number of UEs that will be recipients of the short paging message.

27. The apparatus of claim 25, wherein the short paging message includes information associated with a short-page response resource allocation.

* * * * *